United States Patent

Widiger et al.

[15] 3,645,822
[45] Feb. 29, 1972

[54] METHOD FOR PROVIDING MULTILAYER FILMS HAVING IMPROVED SLIP PROPERTIES

[72] Inventors: Almar T. Widiger; Drew H. Moore, both of Midland, Mich.

[73] Assignee: The Dow Chemical Company, Midland, Mich.

[22] Filed: Jan. 31, 1969

[21] Appl. No.: 795,452

[52] U.S. Cl. ............................156/243, 156/244, 156/309, 156/331, 156/334, 161/252, 161/254, 161/256, 260/32.6 PQ, 260/32.6 N, 260/33.6 PQ
[51] Int. Cl. ..............B29c 19/00, B32b 27/08, C09j 00/00
[58] Field of Search...............161/227, 247, 406, 254, 256, 161/257; 156/244, 243, 309, 331, 334; 260/33.6 PQ, 32.6 PQ, 32.6 N

[56] References Cited

UNITED STATES PATENTS

| | | | |
|---|---|---|---|
| 2,364,875 | 12/1944 | Schieman | 161/406 |
| 2,543,229 | 2/1951 | Chapman | 161/254 |
| 2,679,969 | 6/1954 | Richter | 161/254 X |
| 2,782,976 | 2/1957 | Rinaldi | 161/406 X |
| 3,232,789 | 2/1966 | Pelzek et al | 161/252 |
| 3,253,059 | 5/1966 | Vollmer | 161/252 |
| 3,429,717 | 2/1969 | Cook | 161/256 |
| 3,467,568 | 9/1969 | Williams et al. | 161/252 X |

OTHER PUBLICATIONS

Wittington's Dictionary of Plastics, 1968, Technomic Publishing Co. Inc., 750 Summer St., Stamford, Conn. page 220 and frontispiece

*Primary Examiner*—Harold Ansher
*Assistant Examiner*—C. B. Cosby
*Attorney*—Griswold and Burdick, R. G. Waterman and L. J. Dankert

[57] ABSTRACT

Slip properties of multilayer films of thermoplastic organic polymers are improved by incorporating small amounts of a conventional slip additive, e.g., oleamide, into one or more of the inner layers of said films. Said films exhibit slip characteristics which are retained for relatively long periods of time.

11 Claims, 3 Drawing Figures

PATENTED FEB 29 1972 3,645,822

INVENTORS.
Almar T. Widiger
BY Drew H. Moore

Griswold & Burdick
ATTORNEYS

METHOD FOR PROVIDING MULTILAYER FILMS HAVING IMPROVED SLIP PROPERTIES

BACKGROUND OF THE INVENTION

This invention relates to improvements in the slip properties of self-supporting films of thermoplastic organic polymers. More particularly, this invention relates to new and useful transparent, flexible, essentially moisture and grease-proof composite laminated film structures, so-called multilayer films, possessing slip characteristics which are retained for relatively long periods of time.

Films of the thermoplastic organic polymers, e.g., polyethylene, polypropylene, polymers of other nonaromatic hydrocarbon olefins, and the like, have many attractive characteristics including in general: pronounced chemical inertness; good physical properties (especially significant strength, toughness and resistance to tearing); excellent behavior without marked tendency to embrittlement at low temperature; and, in particular, unusual capability for being heat sealed in order to provide strong, permanent joints upon being thermally welded or fused together when in contact under the influence of heat at elevated temperatures and, if desired, pressure along the seam or other welded area being joined. Such films are widely used for packaging various articles such as foods, metal articles and the like. Unfortunately, particularly in the case of foods, the polyolefin films do not exhibit the air and moisture impermeability which is often desirable.

On the other hand, films of polyvinyl chloride and polyvinylidene chloride possess an unusual ability to provide particularly effective barriers against the transmission or permeation of gases and vapors in addition to water vapor. However, such films have thermal characteristics whereby they do not possess adequate seal strength after attempts to heat seal or thermally weld them together.

In order to obtain films having both good sealing properties and the desired impermeability it has been the practice in the art to bond layers of a heat sealable polymer to layers of polymer having the desired impermeability, so-called barrier polymer, such that the surfaces of the resulting composite laminate film structure are composed of the heat-sealable polymer. While problems have arisen in bonding layers of the heat sealable polymers, e.g., olefin polymers, to layers of the barrier polymers, said problems having generally been solved by using adhesive polymers as interlayers between the heat polymer and the barrier polymer, for example, the olefin/unsaturated ester copolymers.

Unfortunately these multilayer films having surfaces of heat sealable polymers generally exhibit poor slip characteristics, i.e., do not slide readily over each other, which in turn results in poor handling characteristics. The poor slip behavior of the films interferes with their use in automatic processing equipment since the film must pass freely through the fabricating machine (e.g., heat sealer, bag maker, bag loader or filler, bag opener, overwrap package) for it to operate properly and reproducibly. In order to overcome the slip problems in heat-sealable films, it is common to incorporate one or more of several conventional slip additives, e.g., oleamide, stearic acid, erucylamide and the like, in the heat-sealable film. Attempts to solve the slip problems which arise in the multilayer films, hereinbefore described, by incorporating a conventional slip additive into the heat-sealable, exterior layers of film have been only partially successful. In general, said multilayer films having the slip additive in the outer layers of the film retain the desired slip characteristics for only a short period after production of the multilayer film.

In view of the need for multilayer films having slip properties of increased longevity, it would be highly desirable to provide a multilayer film having such desirable slip characteristics and a method for the preparation thereof.

SUMMARY OF THE INVENTION

In the present invention multilayer films of normally solid, melt-extrudable, thermoplastic organic polymers are provided with longer-lasting slip properties. Accordingly a multilayer film having at least one inner layer and at least one exterior layer containing a conventional slip additive is improved and provided with longer-lasting slip properties by incorporating in an inner layer a further amount of slip additive in the range from about 500 to about 7,000 p.p.m. based on the weight of that inner layer; preferably the additive is incorporated into an inner layer adjacent to the exterior layer. Since the function of a slip additive is a surface phenomenon manifested as a measurable property of the exposed surface of the exterior-most plastic layer, it is surprising that the incorporation of an additive in an interior layer would have any effect on such slip property. It is believed that the incorporation of specified amounts of the slip additive into one or more inner layers of the multilayer film substantially prevents migration of the slip additive from the exterior layer or layers to the inner layers. This theory that the slip additive migrates to the inner layers of the multilayer film is supported by the observation that a single layer film having the slip additive uniformly dispersed therein retains its slip properties for a significantly long period of time.

Multilayer films prepared in accordance with this invention are useful in the packaging of foods, metal articles and the like, and also as protective covering or coating for metal, wood, plastic and paper surfaces.

BRIEF DESCRIPTION OF THE DRAWING

In the drawings, various forms of the invention are shown, but it is to be understood that it is not limited to such forms since the invention as set forth in the claims may be embodied in a plurality of forms.

In the Drawings.

DESCRIPTION OF THE PREFERRED EMBODIMENTS

Figure 1:
FIG. 1 depicts the laminate structure of a two layer film in fragmentary cross section in accordance with this invention.
Figure 1A:
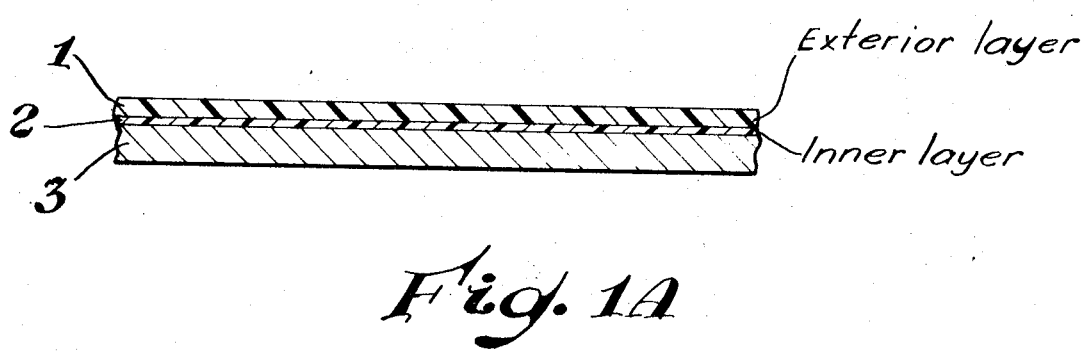
FIG. 1a depicts the two layer film of FIG. 1 as applied to a substrate in fragmentary cross section.

With reference to FIGS. 1 and 1a, there is illustrated the laminate structure of a two layer film having an exterior layer 1 of a thermoplastic organic polymer, comprising a slip additive and discussed hereinafter in detail, and an inner layer 2 of a thermoplastic organic polymer, advantageously an adhesive copolymer such as an ethylene/vinyl acetate copolymer, also comprising a slip additive. More specifically with respect to FIG. 1a, there is illustrated the laminate structure of FIG. 1 as applied to a substrate 3, for example, a substrate comprising an organic polymer, e.g., in the form of a film or a shaped article; wood; metal; glass; cellulose or other materials conventionally laminated with polymeric compositions. Especially appropriate for the purposes of this invention are substrates which require improved surface slip properties.

Figure 2:
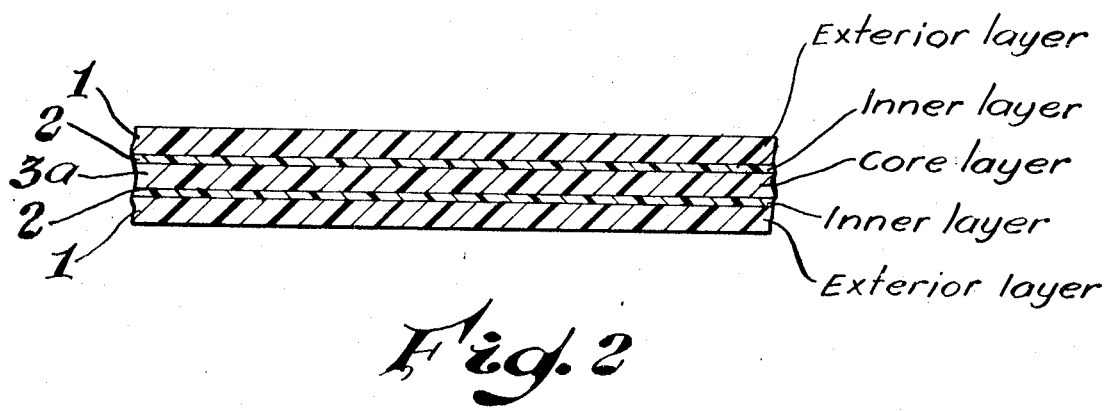
FIG. 2 depicts the laminate structure of a five layer film in fragmentary cross section in accordance with this invention.

FIG. 2 illustrates, by way of a fragmentary cross section, a five layer film comprising a core layer 3a of an organic polymer, advantageously a barrier layer of a vinyl chloride copolymer, as the substrate, two inner layers 2, advantageously layers of an adhesive polymer, laminated to the barrier layer 3a and two exterior layers 1 laminated to the adhesive layers 2. A more complete discussion of five layer films, as depicted in FIG. 2, appears hereinafter. While the core layer 3a has been shown as a layer of plastic in FIG. 2, it will be understood that core layer 3a could alternatively be some material such as metal, paper, fabric, cellophane, or the like.

The improved multilayer films of the present invention comprise at least two layers of a normally solid, thermoplastic melt-extrudable organic polymer and a slip additive.

For the purposes of this invention the term "normally solid, thermoplastic meltdextrudable organic polymer" includes polymers capable of being extruded in the form of thin, flexible sheets or films. Suitable examples are polymers of the following monomers: the mono-olefins and conjugated diolefins, e.g., ethylene, propylene, butene-1, iso-butene, 1,3-butadiene, isoprene and other aliphatic mono- and diolefins; the halogen substituted olefins, e.g., vinyl chloride, vinylidene chloride and the like; the monovinylidene aromatic compounds, e.g., styrene, α-methylstyrene, ar-methylstyrene, chlorostyrene and other aromatic olefins; the unsaturated carboxylic acid esters including the esters of α,β-ethylenically unsaturated carboxylic acids such as ethyl acrylate, methyl methacrylate, butyl acrylate, propyl itaconate, iso-butyl acrylate, ethyl maleate, methyl fumarate, etc., and the unsaturated esters of saturated carboxylic acids such as vinyl acetate, vinyl propionate, vinyl butyrate, 2-propenyl acetate and the like; the α,β-ethylenically unsaturated carboxylic acids, e.g., acrylic acid, methacrylic acid, maleic acid and anhydride, fumaric acid, itaconic acid, and the like; and other vinyl compounds, e.g., acrylonitrile, acrylamide, methyl vinyl ether and the like. Also included are the polyamides such as nylon, chlorinated polyolefins such as chlorinated polyethylene and the like. Of particular interest in the practice of this invention are polyethylenes, ethylene/vinyl acetate copolymers, ethylene/ethyl acrylate copolymers, ethylene/acrylic acid copolymers, ethylene/iso-butyl acrylate copolymers, polypropylenes, ethylene/propylene copolymers, propylene/butene-1 copolymers, polyvinyl chloride, vinyl chloride copolymers, vinylidene chloride/acrylonitrile copolymers, vinylidene chloride/vinyl chloride copolymers, copolymers of vinylidene chloride with acrylic acid, methacrylic acid or their ester derivatives, polystyrene, styrene/1,3-butadiene copolymers, nylon, chlorinated polyethylenes and the like. Preparation of such polymers are well known to those skilled in the art, and therefore are not described.

Slip additives contemplated in the practice of this invention are the slip additives known to those skilled in the art. Of particular interest, however, are the non-ionic surfactants, especially the amides and carboxylic acids. Amides which are preferred are the amides of carboxylic acids having at least five carbon atoms, for example, behenamide, linolenamide, arachidamide, ricinole-amide, palmitamide, myristamide, linoleamide, lauramide, capramide, pelargonamide, caprylamide, oleamide, erucyl-amide, stearamide, N,N'-ethylene bisoleamide and the like. Carboxylic acids which are preferred have at least four carbon atoms, for example, butyric, caproic, caprylic, capric, lauric, lauroleic, myristic, myristoleic, pentadecanoic, palmitic, palmitoleic, margaric, stearic, oleic, linoleic, linolenic, ricinoleic, 2,3-dihydroxystearic, 12-hydroxystearic, behenic, eleostrearic, arachidic, 2-ecosenoic, 2,4-eicosadienoic, 2-docosenoic, 2-tetracosenoic, 2,4,6-tetracosatrienoic and the like.

In one group of preferred embodiments the improved multilayer films of this invention, as depicted in FIG. 1a, have at least one heat sealable exterior layer 1, usually of a nonaromatic olefin polymer such as polyethylene, a barrier layer 3 of a vinylidene chloride copolymer, polyvinyl chloride, chlorinated polyethylene or the like and an adhesive layer 2 interposed therebetween to bond the exterior layer to the barrier layer. Usually the adhesive layer 2 comprises chlorinated polyethylene or a copolymer of ethylene and vinyl acetate, ethyl acetate, vinyl chloride or iso-butyl acrylate, preferably an ethylene/vinyl acetate copolymer. In these preferred embodiments the slip additive, such as oleamide or erucylamide, is incorporated into the polymer to be used as the exterior layer 1, in amounts generally ranging from about 500 to about 4,000 p.p.m. based on said polymer. In accordance with the improvement of this invention a further amount of specified slip additive, such as oleamide or erucylamide, is also incorporated into the adhesive polymer layer 2 in amounts ranging from about 500 to about 7,000 p.p.m. based on the adhesive polymer, with amounts between about 2,000 and about 4,000 p.p.m. being especially preferred. As a further refinement of these preferred embodiments, a specified slip additive is also incorporated into the barrier polymer in amounts ranging from about 500 to about 3,000 p.p.m. based on the barrier polymer.

Illustrative of one preferred embodiment is a multilayer film, for example, as depicted in FIG. 2, having an average thickness ranging from about 0.5 to about 6 mil and comprising (1) a center barrier layer 3a, e.g., a layer of a vinylidene chloride/vinyl chloride copolymer, (2) an adhesive layer 2 laminated to each side of the barrier layer 3a, the adhesive layers 2 comprising, for example, an ethylene/vinyl acetate copolymer having incorporated therein from about 200 to about 4,000 p.p.m. of a specified slipping agent, e.g., oleamide or erucylamide, and (3) an exterior layer 1 laminated to each of the adhesive layers 2, the exterior layer 1 comprising an olefin polymer, e.g., polyethylene, having incorporated therein from about 1,000 to about 3,000 p.p.m. of a specified slipping agent.

In another embodiment a larger amount of slip additive, e.g., up to about 7,000 p.p.m. is incorporated into one or more inner layers of a multilayer film and only a smaller amount of slip additive, e.g., less than 1,000 p.p.m., is incorporated into the exterior layer or layers. Films in accordance with this embodiment are sufficiently adhesive to retain printing inks, etc., on their surfaces during printing processes carried out immediately after fabrication. However, they develop an increasing degree of slip with the passage of time as a result of the slip additive migrating from the inner layers to the exterior layers. It is understood, however, that positive net migration from the inner layers to the exterior layers occurs only if a substantially larger amount of slip additive is present in the inner layer initially than in the outer layer.

The improved multilayer films of the present invention optionally contain other ingredients such as lubricants, antistatic agents, antiblocking and antifogging agents, cohesion additives, additives which improve clarity, antioxidants, coloring matter and the like, provided, however, that the amount used is insufficient to substantially alter the slip properties of the multilayer films.

The slip additives are readily incorporated into the polymers by dry blending the specified polymer with one or more of the specified slip additives, extruding the blend to produce a concentrate of the polymer and slip additive, pelletizing the concentrate, and thereafter blending the concentrate with sufficient additional polymer to form the final desired composition. After a substantially homogeneous mixture is obtained, the composition is cooled and ground into particles of a size suitable for extrusion into films or sheets. It is further understood by those skilled in the art that other methods can also be effectively used to obtain the desired compositions, such as blending the components on a conventional rubber mill, or in a Banbury mixer at a temperature at which the polymer becomes plastic.

Conventional methods for preparing multilayer films are generally suitable for preparing films in accordance with this invention. Illustratively each layer may be prepared in a separate process by extruding the polymer through an annular die, blown into the form of a bubble or tube having a bubble wall of the desired thickness, cooled, collapsed and cut into the desired dimensions. This method is suitable for the production of films or layers having thicknesses of from 0.2 to 5 mil. In addition the layers may be separately made by calendaring or by slot extrusion. The multilayer film can then be provided by laminating the layers in an operation wherein the layers, separately made, are pressed together at elevated temperature, e.g., 300° F.

Preferably the multilayer films are prepared by coextruding the desired polymer compositions. Accordingly the respective polymer compositions are fed into separate polymer feeding devices of a co-extrusion apparatus for preparing sheet, film and coating, for example, as described in Belgian Pat. No.

683,208. By this technique, the finished multilayer film is taken directly from the coextrusion apparatus and no further operation is required.

The following examples are given to illustrate this invention and should not be construed as limiting its scope. In the specification and claims all parts and percentages are by weight unless otherwise indicated. In addition all melt indexes and melt flow viscosities are determined according to ASTM D-1238-T(E).

EXAMPLE 1

A composition of polyethylene having a density of 0.921 and a melt index of 3.0 decig/min. and containing 1,500 p.p.m. of erucylamide and 375 p.p.m. of stearamide is prepared by mixing the components in a screw-type extruder in such proportions to prepare a concentrate containing 2 percent of combined slip additive. The mixture is extruded in a conventional manner and subsequently pelletized. The pelletized concentrate is dry blended with sufficient polyethylene to produce a composition having the specified concentrations. A composition of ethylene/vinyl acetate copolymer (72/28) having a melt flow viscosity of 6 decig/min. and containing 1,500 p.p.m. of erucylamide and 375 p.p.m. of stearamide by blending the copolymer with the slip additives according to the procedure described above. The above compositions and a film-grade vinylidene chloride/vinyl chloride copolymer (15/85) are fed separately into three extruders: two 1¼ inch screw-type extruders and a 1 inch extruder, respectively. Each extruder feeds into a single die having five slots arranged in a horizontal and parallel fashion one on top of the other. The extruder supplying the vinylidene chloride/vinyl chloride copolymer feeds into the centermost slot, the extruder supplying the ethylene/vinyl acetate copolymer composition feeds into the two slots adjacent to the centermost slot and the extruder supplying the polyethylene composition feeds into the two outermost slots. The five slots feed into a single sheet die having an average width of 24 inches to form a multilayer film having a total thickness of 2 mils and two exterior layers of the polyethylene composition, each layer having an average thickness of 0.6 mil, two inner layers of the ethylene/vinyl acetate copolymer composition, each layer having an average thickness of 0.2 mil, and a centermost layer of vinylidene chloride/vinyl chloride copolymer having an average thickness of 0.4 mil. The resulting multilayer film is tested for slip properties immediately and at various intervals up to 24 hours by measuring the coefficient of friction of the film. The results are recorded in Table I.

For the purposes of comparison a control multilayer film ($C_1$) is prepared according to Example 1 except that the ethylene/vinyl acetate copolymer layers contain no erucylamide or stearamide. The control multilayer film is tested for slip properties after various periods of time. The results are recorded in Table I.

TABLE I

| | Concentration of slip additive in— | | | | | | | |
|---|---|---|---|---|---|---|---|---|
| | Exterior layers, p.p.m. | | Adhesive layers, p.p.m. | | Coefficient of friction [1] after— | | | |
| Example number | Erucyl- amide | Stear- amide | Erucyl- amide | Stear- amide | 0 | 4 hrs. | 8 hrs. | 24 hrs. |
| 1 | 1,500 | 375 | 1,500 | 375 | 0.10 | 0.10 | 0.10 | 0.10 |
| $C_1$* | 1,500 | 375 | 0 | 0 | 0.11 | 0.11 | 0.5 | 2.7 |

[1] Films are stored at 100° F. for the times specified and the coefficient of friction of the films at room temperature of the films is determined according to ASTM D-1894-63.
*Not an example of this invention.

EXAMPLE 2

A composition of the polyethylene used in Example 1 containing 2,000 p.p.m. of oleamide is prepared according to the blending procedure described in Example 1. A composition of the ethylene/vinyl acetate copolymer of Example 1 and 3,000 p.p.m. of oleamide is similarly prepared. The above compositions and the vinylidene chloride/vinyl chloride of Example 1 are fed into the coextrusion apparatus described in Example 1 such that a multilayer film having a vinylidene chloride/vinyl chloride copolymer core, a layer of the ethylene/vinyl acetate copolymer laminated to each surface of the core layer and exterior layers of polyethylene laminated to the ethylene/vinyl acetate copolymer layers. The multilayer film is tested for slip properties and the results are shown in Table II.

For the purposes of comparison a control multilayer film ($C_2$) is prepared according to Example 2 except that no oleamide is incorporated into the ethylene/vinyl acetate copolymer. The film is tested for slip properties and the results are shown in Table II.

TABLE II

| | Concentration of oleamide in— | | Coefficient of friction [1] | | | |
|---|---|---|---|---|---|---|
| | Polyethyl- ene layers, | Ethylene/ vinyl ace- tate copoly- mer layers, | Immedi- | After | | |
| Ex. No. | p.p.m. | p.p.m. | ately | 4 hr. | 8 hr. | 24 hr. |
| 2 | 2,000 | 3,000 | 0.12 | 0.30 | 0.54 | 0.48 |
| $C_2$* | 2,000 | 0 | 0.12 | 0.72 | 0.72 | 0.72 |

[1] Films are stored at 120° F. for the times specified. The coefficients of friction of the films at room temperature are determined according to ASTM-1894-63.
*Not an example of this invention.

EXAMPLE 3

A multilayer film is prepared according to Example 1 except that 4,000 p.p.m. of 12-hydroxystearic acid is incorporated into the polyethylene as the sole slip additive and 5,500 p.p.m. of the same is incorporated into the ethylene/vinyl acetate copolymer. The film is stored at 120° F. for 7 days and tested for slip properties. The results of the tests are recorded in Table III.

TABLE III

| | | Concentration of slip additive in— | | | |
|---|---|---|---|---|---|
| | | Poly- ethylene layers, | Ethylene/ vinyl acetate copolymer layers, | Coefficient of friction [1] | |
| Example number | Slip additive | p.p.m. | p.p.m. | Immedi- ately | After 7 days |
| 3 | 12-hydrostearic acid | 4,000 | 5,500 | 0.398 | 0.368 |

[1] Same as [1] in Table II.

What is claimed is:

1. A method for providing a multilayer film with long-lasting slip properties comprising the steps of (1) incorporating into a first normally solid, thermoplastic, melt-extrudable organic polymer from about 500 to about 7,000 p.p.m. of slip additive based on the weight of said first polymer, (2) incorporating into a second normally solid, thermoplastic, melt-extrudable organic polymer from about 500 to about 4,000 p.p.m. of slip additive based on the weight of said second polymer, (3) forming said first and second polymers into layers, and (4) bringing said layers together to form a multilayer film having a layer of said first polymer as an inner layer adjacent to an exterior layer of said second polymer wherein the concentration of slip additive in the inner layer is greater than the concentration of slip additive in the exterior layer.

2. The method according to claim 1 wherein the slip additive is a non-ionic surfactant.

3. The method improvement according to claim 1 wherein the slip additive is an amide of a carboxylic acid having at least five carbon atoms.

4. The method improvement according to claim 3 wherein the amide is oleamide.

5. The method according to claim 3 wherein the amide is erucylamide.

6. The method according to claim 1 wherein the slip additive is a carboxylic acid having at least four carbon atoms.

7. The method according to claim 6 wherein the carboxylic acid is 12-hydroxystearic acid.

8. The method according to claim 1 wherein the inner layer has incorporated therein from about 2,000 to about 4,000 p.p.m. of the slip additive and the exterior layer contains from about 500 to about 4,000 p.p.m. of the slip additive based on the weight of the exterior layer.

9. The method according to claim 1 wherein the multilayer film comprises (1) a center barrier layer of a vinylidene chloride copolymer, (2) an adhesive layer of an ethylene/vinyl acetate copolymer laminated to each side of the barrier layer and (3) an exterior layer of an olefin polymer laminated to each of the adhesive layers.

10. The method according to claim 9 wherein each of the two adhesive layers has dispersed therein from about 500 to about 7,000 p.p.m. based on the weight of the adhesive layers of an amide of a carboxylic acid having at least five carbon atoms and each of the exterior layers contains from about 500 to about 4,000 p.p.m. based on the weight of the exterior layer of an amide of a carboxylic acid having at least five carbon atoms.

11. A method according to claim 1 wherein steps (3) and (4) are carried out by feeding said first and second polymers separately into a coextrusion means and coextruding said polymers in the form of said multilayer film.

* * * * *

UNITED STATES PATENT OFFICE
CERTIFICATE OF CORRECTION

Patent No. 3,645,822  Dated February 29, 1972

Inventor(s) Almar T. Widiger and Drew H. Moore

It is certified that error appears in the above-identified patent and that said Letters Patent are hereby corrected as shown below:

Column 3, line 2, change "meltdextrudable" to read -- melt-extrudable --.

Column 5, line 22, change "D-1238-T(E)" to read -- D-1238-65T(E) --.

Column 7, Claim 3, line 18, delete -- improvement --.

Column 7, Claim 4, line 21, delete -- improvement --.

Signed and sealed this 8th day of August 1972.

(SEAL)
Attest:

EDWARD M. FLETCHER, JR.
Attesting Officer

ROBERT GOTTSCHALK
Commissioner of Patents